(12) United States Patent
Koenigsknecht et al.

(10) Patent No.: US 9,446,904 B2
(45) Date of Patent: Sep. 20, 2016

(54) INTERCHANGEABLE INSERT FOR AN AUGER

(71) Applicants: Tony Lee Koenigsknecht, Chicago, IL (US); Albert John Kohn, Bridgman, MI (US); Scott Alan Albright, Buchanan, MI (US); Robert Kevin Blake, Three Oaks, MI (US); Jonathan Charles Shoemaker, Coloma, MI (US)

(72) Inventors: Tony Lee Koenigsknecht, Chicago, IL (US); Albert John Kohn, Bridgman, MI (US); Scott Alan Albright, Buchanan, MI (US); Robert Kevin Blake, Three Oaks, MI (US); Jonathan Charles Shoemaker, Coloma, MI (US)

(73) Assignee: FREEOSK, INC., Chicago, IL (US)

( * ) Notice: Subject to any disclaimer, the term of this patent is extended or adjusted under 35 U.S.C. 154(b) by 534 days.

(21) Appl. No.: 13/940,032

(22) Filed: Jul. 11, 2013

(65) Prior Publication Data
US 2013/0331979 A1    Dec. 12, 2013

Related U.S. Application Data

(63) Continuation-in-part of application No. 13/100,595, filed on May 4, 2011.

(60) Provisional application No. 61/331,183, filed on May 4, 2010.

(51) Int. Cl.
| | | |
|---|---|---|
| G07F 11/00 | (2006.01) |
| B65G 33/04 | (2006.01) |
| G07F 11/44 | (2006.01) |
| G07F 9/10 | (2006.01) |
| G07F 11/02 | (2006.01) |
| B65B 1/12 | (2006.01) |

(52) U.S. Cl.
CPC ................ *B65G 33/04* (2013.01); *G07F 9/10* (2013.01); *G07F 11/02* (2013.01); *G07F 11/44* (2013.01); *B65B 1/12* (2013.01)

(58) Field of Classification Search
CPC ................................ B65B 1/12; B65G 33/04
USPC ................ 221/222, 237, 265; 700/232, 243
See application file for complete search history.

(56) References Cited

U.S. PATENT DOCUMENTS

| | | | | | |
|---|---|---|---|---|---|
| 5,427,224 | A  * | 6/1995 | Suehara | ............... | B65G 47/248 198/396 |
| 6,367,611 | B1 * | 4/2002 | Kuenzler | ........... | B65G 47/1428 198/389 |
| 8,066,150 | B2 * | 11/2011 | Clarke | .................. | G07F 11/005 221/198 |
| 2009/0281657 | A1 * | 11/2009 | Gak | ...................... | A61J 7/0481 700/242 |
| 2012/0205161 | A1 * | 8/2012 | Stimpfle-Ziegler | ....... | E02D 5/36 175/394 |
| 2013/0331979 | A1 * | 12/2013 | Koenigsknecht | ...... | B65G 33/04 700/225 |

* cited by examiner

*Primary Examiner* — Michael K Collins
(74) *Attorney, Agent, or Firm* — Seyfarth Shaw LLP

(57) ABSTRACT

An interchangeable flighting insert is disclosed to maximize the efficiency of singularly delivering objects, such as products, to a user through a product dispensation device. The flighting insert can be removably coupled to an auger of the product dispensation device, thereby allowing variation of the flighting characteristics based on the object to be dispensed. The same auger can therefore use a first flighting for certain products, and a second flighting for different products.

9 Claims, 14 Drawing Sheets

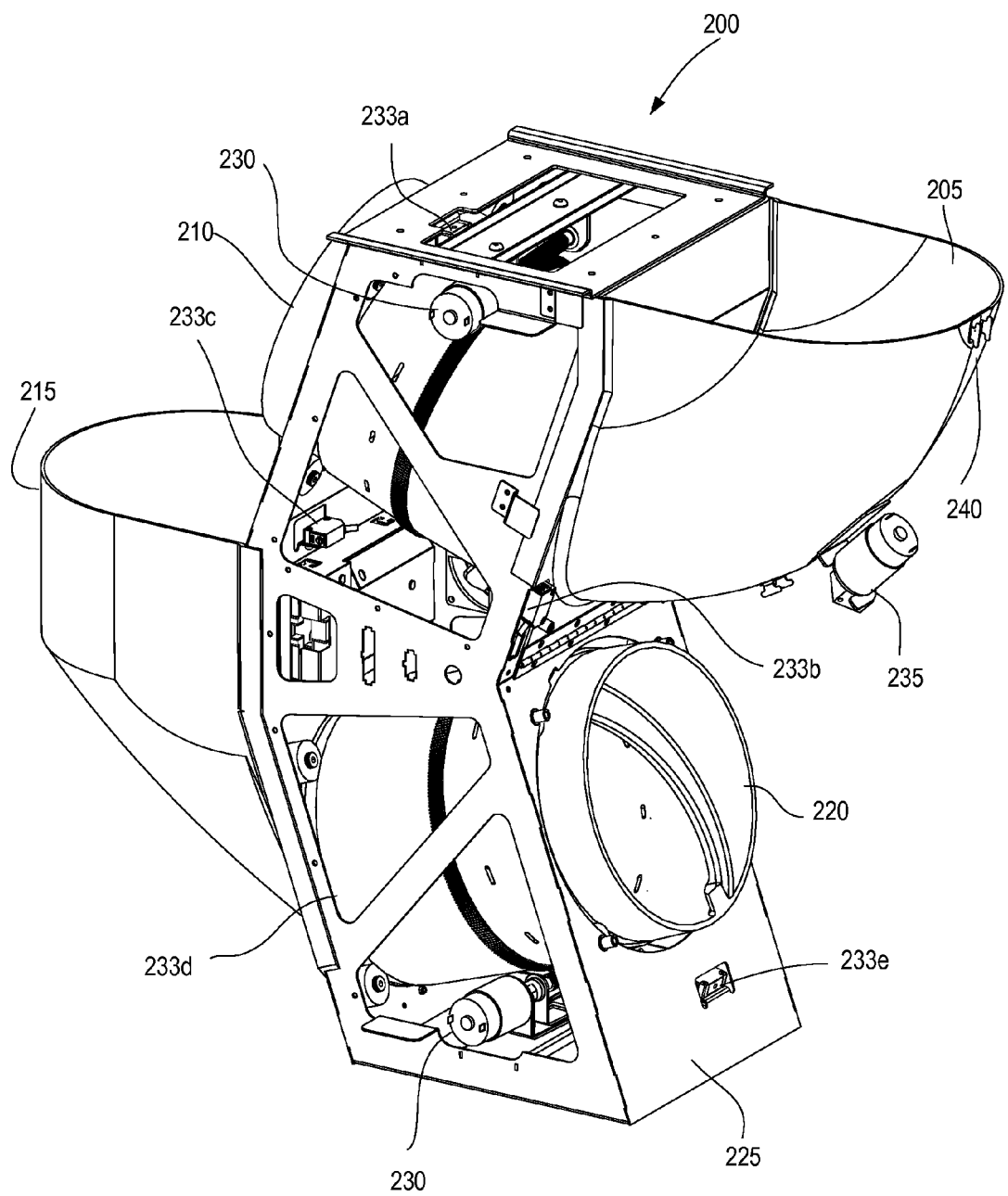

INTERCHANGEABLE INSERT FOR AN AUGER

RELATED APPLICATIONS

This application is a continuation-in-part of U.S. patent application Ser. No. 13/100,595, filed May 4, 2011, which claims priority to provisional patent application Ser. No. 61/331,183, filed May 4, 2010, the contents of which are herein incorporated by reference in their entirety.

TECHNICAL FIELD OF THE INVENTION

The present invention relates generally to an interchangeable insert, and more particularly, to an interchangeable flighting for an auger or inverted auger.

BACKGROUND OF THE INVENTION

A popular marketing technique is to provide free product samples to potential customers to entice the customers to buy the sampled product. The free sample can be provided to the customer by an employee of, for example, a grocery store during regular working hours while the customer is otherwise shopping for other products. The store employee can then sell the customer the product by pointing the customer to the area of the store where that product is sold, typically close to where the free sample is provided. This marketing tool is especially popular for products that have only recently entered the market or where potential customers are not likely to have sampled the product through conventional means.

Single product dispensation can also be dispensed through automated means, as described in U.S. patent application Ser. No. 13/100,595. For example, a product dispensation device can dispense a single product when a user scans a barcode, instructs the dispensation device through a smart phone application, or through any other manner of identification.

Automated product dispensation devices strive to deliver one product at a time. To accomplish this, the dispensation devices operate at parameters to achieve maximum efficiency to ensure that only one product, from a plurality of products, is dispensed. For example, the device may include rotating augers with flighting that is shaped and sized to deliver a specific product seriatim, based on that product's shape, size, and/or weight. However, typically flighting dimensions are normalized for all products, regardless of size, shape or weight. For example, using auger flighting that is optimized for a larger product may cause more than one product to be delivered when smaller products are used with the same flighting. Therefore, there exists a need to change the flighting of an auger for a product dispensation device that is optimized for delivery of a specific product.

SUMMARY OF THE INVENTION

The present application discloses an interchangeable flighting insert adapted to be removably coupled to an auger device adapted to singularly dispense objects, such as products. Different inserts can vary flighting characteristics such as the cross-sectional profile, length, height, material, weight, frictional coefficient, and color of the flighting. The insert can couple to an inside of an auger by, for example, magnets, to provide an easily removable component that aids in more efficient delivery of objects.

In particular, the present application discloses an auger adapted for dispensing objects in a singular manner, the auger including a first open end adapted to receive the objects and an opposing second open end adapted to singularly dispense the objects, and an inner surface having a flighting insert disposed thereon from the first open end to the second open end, wherein the flighting insert is removably coupled to the inner surface.

Also disclosed is an auger adapted for dispensing objects in a singular manner, the auger including a first open end adapted to receive the objects and an opposing second open end adapted to singularly dispense the objects, an inner surface having fixed flighting disposed thereon from the first open end to the second open end, and a flighting insert removably coupled to the fixed flighting and extending radially inward from the fixed flighting, the flighting insert having a shape or profile different than the fixed flighting.

Further disclosed is a product dispensing device including a base, a frame disposed within an interior of the base, a hopper including an opening allowing an object to be dispensed therethrough, the hopper being accessible within an exterior of the base, and at least one auger having first and second open ends and being coupled to the frame and rotatable thereon, the first open end of the at least one auger being structured to receive the object dispensed through the opening of the hopper, wherein the at least one auger includes a barrel portion having an inner surface, fixed flighting extending at least partially between the first and second open ends of the at least one auger, the fixed flighting being one of integral with and attached to the barrel portion, a flighting insert removably coupled to at least one of the fixed flighting and the inner surface, and magnets disposed on at least one of the fixed flighting and the inner surface and adapted to removably couple to the flighting insert.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages should be readily understood and appreciated.

FIGS. 2A-2D illustrate a delivery system implemented within the product dispensing device shown in FIG. 1.

DETAILED DESCRIPTION OF PREFERRED EMBODIMENTS

Figure 1:
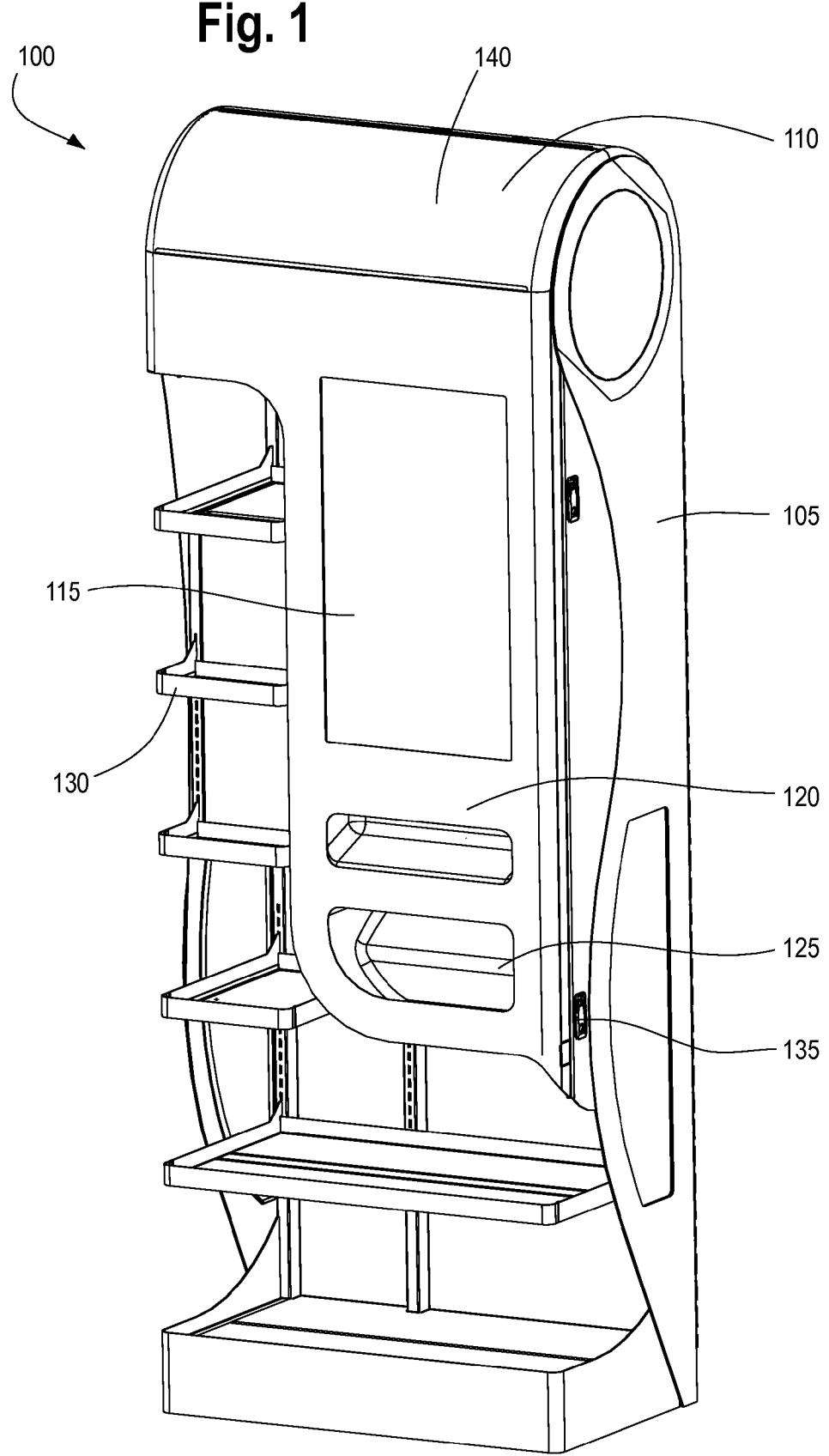
FIG. 1 illustrates an embodiment of a product dispensing device.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The present application discloses an auger having one or more interchangeable flighting inserts adapted to deliver a single object to a user through a product dispensation device. The product dispensation device can include one or more augers with flighting that increases the efficiency of delivery. Different inserts are described that vary flighting characteristics by coupling a removable insert to, for example, fixed flighting. The same auger can therefore use a first flighting insert, having a particular profile, material, frictional coefficient and/or shape, for some products, but also use a second flighting insert, having a different profile, material, frictional coefficient, and/or shape compared to the first flighting, for different products.

The disclosed interchangeable flighting insert can be implemented within any device, for example, a product dispensation device including multiple inverted augers. The multiple auger device is adapted to improve efficiency of singular dispensation of objects by combining the individual efficiency of each auger. During experimentation, it was discovered that a first auger distributes products at 70% efficiency (i.e., 70% of the test runs distributed one product, while 30% of the test runs distributed multiple products, which is undesirable). Also, a second auger singularly distributed objects at 80% efficiency. However, when used together with the second auger following the first auger, the two augers achieved more than 90% efficiency of singularly dispensing objects due to the combined individual efficiency of the two augers. Although two augers are used in this system, a primary bulk auger could be used in series with another singulation/dispensing device. Additionally, more than two augers may be used to further improve efficiency in the case of smaller products or products that are more susceptible to decreased efficiency.

As shown in FIG. 1, a product dispensing device 100 is provided and includes a base 105 and a hopper 110 disposed at the top of the base 105. A touch-screen display 115, or other display, may be included above a scanner 120 capable of scanning a device carried by a user, for example, a magnetic, bar code, RFID card or smartphone. Below the scanner 120 is provided a dispensation area 125 where objects, such as desired products, are delivered singularly when the dispensing process is complete. For holding a plurality of products that can be purchased, a shelf 130 is provided on the side of the base 105. To allow access to the internal components of the product dispensing device 100, a portion of the front of the base 105 may be coupled to the base, such as with hinges, and latched on the side with latches 135. In addition, an access point 140 can be provided adjacent or within the hopper 110 to allow for wireless or wired communication between the product dispensing device 100 and an external computer system.

The base 105 acts as the structural backbone of the product dispensing device 100 and can be made of any material, for example, metal, plastic, wood, or any other substance that allows for structural stability. In an embodiment, the base 105 is made of a powder-coated steel. As discussed above, the base 105 includes shelves 130 for holding products, and includes several openings for the user to scan a device, such as a card (below the scanner 120), for the user to obtain the product dispensed (in the dispensation area 125), and an opening for a touch-screen display 115, such as a touch-screen display that is adapted to interact with the users.

The hopper 110 is coupled to the base 105, and as described below with respect to FIG. 5, includes a hinged portion and a support portion. Products can be loaded into the product dispensing device 100 by placing a plurality of products, such as in bulk form, inside an opening of the hopper 110 which communicates with internal features of the device 100 to singularly distribute the product to a consumer. The hopper 110 can be opened by the hinged portion and products can be distributed into the opening for future dispensation. Various ribs or deflector plates can also be provided inside the hopper 110 to control the flow of products from the hopper into the remainder of the product dispensing device 100.

Adjacent or inside the hopper 110 is the access point 140 which is operably coupled to an external computer adapted to control the device 100. The access point 140 may include a transceiver capable of communicating through wired and/or wireless communications, for example, a telephone or Internet connection, a DSL connection, a cable connection, a 3G, 4G or other cellular communication method, a 802.11 wireless connection, or any other form of electronic communication.

The access point 140 can communicate with an external computer to send the external computer data from the product dispensing device 100. For example, the access point 140 can transmit to the external computer data relating to the amount of product remaining in the product dispensing device 100, the number of scans on a particular day, what identification devices were scanned on a particular day, individual purchasing behavior of relevant consumers, or any other type of data that may be deemed useful. In addition, the external computer can communicate with the access point 140 to deliver information to the product dispensing device 100. For example, the external computer can communicate software updates to the product dispensing device 100 via the access point 140, or can communicate new instructions to the product dispensing device 100 that change the video or image displayed on the display 115. A service technician can also update the video or image displayed on the display 115 by scanning a "Program Changeover Instructional" card (or other identifying indicia) in the scanner 120 to effectively change the marketing material on the display 115 with the simple scan of a card.

The display 115 can visually depict video or images relating to the product that is dispensed from the product dispensing device 100, and can further display information for the user. For example, the display 115 can provide an advertisement for the product being dispensed and can include the instructions "Scan Card Now" or "Push Here for Instructions on How to Obtain a Card." By way of example, the display 115 can include a liquid crystal display (LCD), organic light-emitting diode (OLED) display, plasma screen, cathode ray tube display, or any other kind of black and white or color display that will allow the user to view and interpret information on the product dispensing device 100 and may further include touch-screen capabilities.

The scanner 120 can be any electrical, optical, RFID or electromagnetic device that can read a card or other sort of identification means. For example, the scanner 120 can be a bar code scanner, a magnetic card reader, a fingerprint reader, a magnetic strip reader, a smart card reader, RFID reader, an optical reader, or any other form of apparatus that allows identification to be verified. In an embodiment, the scanner 120 is a barcode scanner that reflects light off of a barcode through an opening in the base 105 on to the user's card. Alternatively, the scanner 120 can transmit light off of a mirror or set of mirrors and on to the barcode. The barcode can be located on a card, smart phone, or any other device. The light from the scanner 120 can either be constantly transmitted to the area at which the user scans a card, or can be activated once a sensor is tripped to notify the sensor that a card is present.

As discussed herein, the user can scan a card with an identification number to dispense a product from the product dispensing device 100, or can otherwise command the product dispensing device 100 to dispense a product. In an embodiment, the user scans a barcode on a card to command the product dispensing device 100 to dispense the product. However, the card can be any form of electrical, optical or electromagnetic device capable of being scanned by the scanner 120. Further, the card need not be a free sample card, but can be a credit card, debit card, or other form of device capable of transmitting money, points, or other currency derivative to the product dispensing system 100. A user can also verify their identity without a card, for example, by scanning a fingerprint or other biometric identifier, by using a mobile phone or other portable electronic device to send a text message or other electronic signal, by transmitting identifying data via a Bluetooth connection, by user input to the display 115, or any other activation method.

The dispensation area 125 can be disposed below the scanner 120 and can be the end point of products dispensed through the product dispensing device 100. When products are delivered to the dispensation area 125, a light may flash to alert the user that the product has arrived. Alternatively, the display 115 or a sound can alert the user that their product is in the dispensation area 125, or such alerts can be provided by emitting a sound.

One or more shelves 130 can be provided on the base 105 to hold products thereon. As shown, the shelves 130 are provided on the side and the bottom of the base 105. However, the product dispensing device 100 need not have any shelves 130, or such shelves 130 can be provided independent of the product dispensing device 100 (for example, on standard shelving at grocery stores) to allow for a smaller footprint of the product dispensing device 100.

The delivery system 200 will now be discussed with reference to FIGS. 2A-2D. As shown, the delivery system 200 includes an elbow 205, a bulk auger 210, a dispensing chute 215 and a delivery auger 220 disposed on a frame 225. To facilitate movement of the augers 210, 220, one or more motors 230 can be provided that are adapted to engage with the augers 210, 220 in order to rotate the augers 210, 220. Of course, the motors 230 need not engage with their respective augers 210, 220 at the same time. Further, one or more sensors 233a-e can be provided on the delivery system 200 to determine the location of products within the product dispensing device 100. Agitators 235 can also be provided to shake the various components of the delivery system 200 and dislodge products that have coagulated together or are otherwise lodged in place.

The elbow 205 can be shaped as a quarter circle scoop and can receive from the hopper 110 the products that are to be dispensed through the product dispensing device 100. As shown, the elbow 205 is in the closed position. However, the elbow 205 can be hinged to the frame 225 or any other part of the product dispensing device 100, and can rotate away from the bulk auger 210 to allow a serviceman to purge the elbow 205 and/or retrieve the contents of the bulk auger 210. To hold the elbow 205 closed, a flexible cord (e.g., a bungee cord) can be attached to the frame 225 and to the cord attachment 240. Other means of securing the elbow 205 in a closed position can also be used, such as, for example, latches, locks, magnets, and the like. A serviceman can thus easily undo the cord from the frame 225 and purge the elbow 205.

After a product is dispensed through the elbow 205, the product can enter the bulk auger 210. As used throughout this application, the term "auger" means an inverted auger that includes an outer barrel and internal spiral flighting extending at least partially from one open end of the barrel to the other open end of the barrel. The inverted auger of the present application allows an internal wall of the outer barrel to rotate which, in turn, rotates the flighting inside the barrel. The flighting can be either integral with or removably coupled to the outer barrel.

The inverted auger design is advantageous to that of conventional augers. Conventional augers include a fixed barrel that does not rotate. Rather, in a conventional auger, contents are transported using a spiral flighting that rotates within the fixed barrel. The conventional fixed barrel design produces several pinch points between the flighting and the barrel that can damage the product being dispensed. In contrast, the auger of the present application rotates the barrel together with the spiral flighting, creating fewer pinch points and reducing the risk of product damage.

Figure 3A:
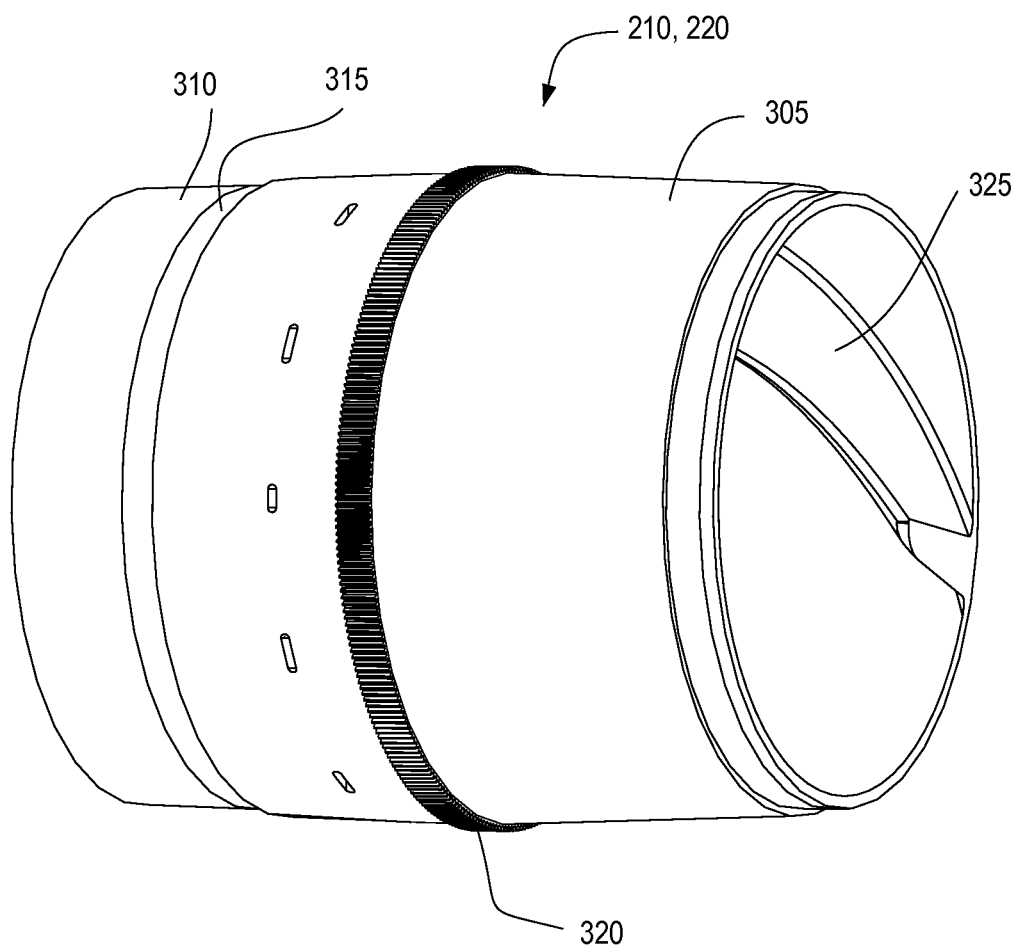
FIGS. 3A-3C illustrate an inverted auger according to an embodiment of the present application.
Figure 3B:
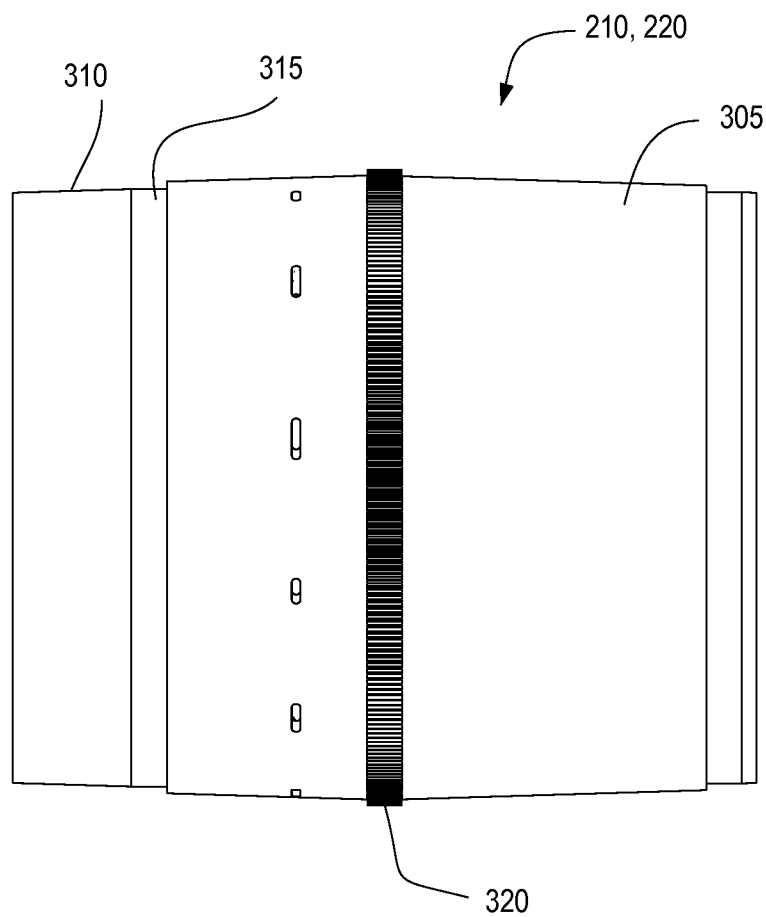
Figure 3C:
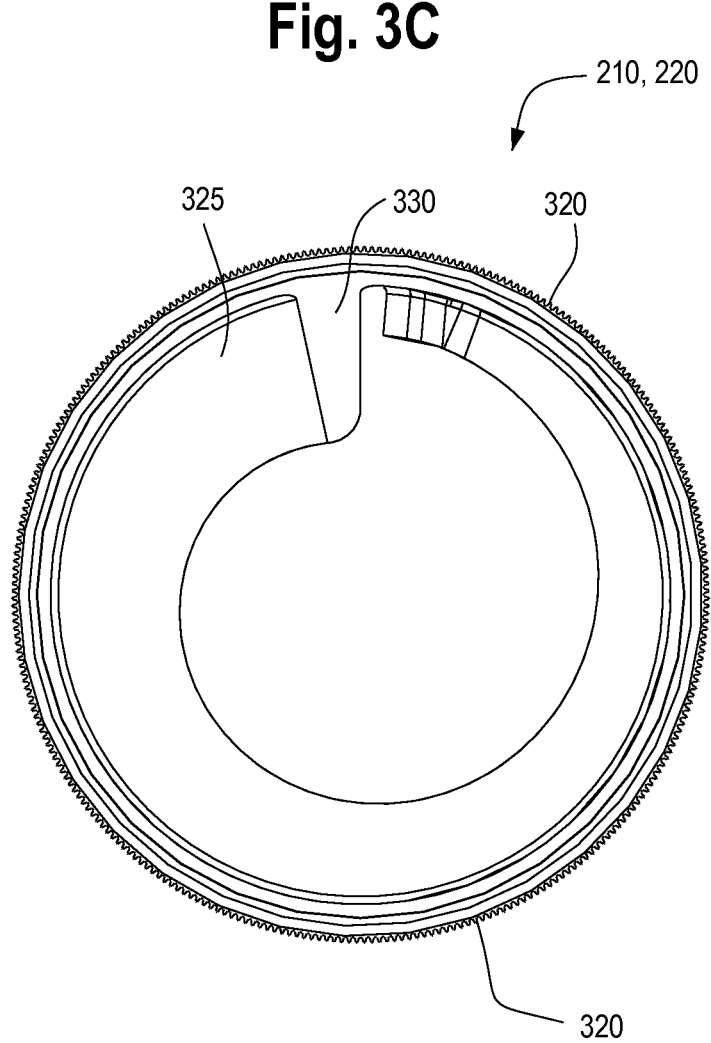

As shown in FIG. 3A-3C, the augers 210, 220 include a main body 305, lower body 310 and a ridge 315 on the outer surface of the auger 210, 220. Further, a worm gear 320 can be provided on the auger 210, 220 for engaging the motor 230. The auger 210, 220 can be a single injection-molded device or can be fastened together by two or more components. On the inside of the auger 210, 220, fixed flighting 325 is provided with an extending portion 330 that can be located on at least one of the ends of the fixed flighting 325. Mechanical activation of the augers 210, 220 can be by other mechanical means including an axial gear drive, a friction wheel (i.e. rubber wheel on the outer surface of the auger), belt drive or any other appropriate means.

As shown, the main body 305 is displaced from the lower body 310 by way of a ridge 315. The ridge 315 allows for the auger 210, 220 to fit within the frame 225 and rotate therein. The auger 210, 220 also includes two open ends with the fixed flighting 325 extending from one open end to the other open end and facilitating movement of individual products from one of the open ends to the other. For example, a product loaded into the hopper 110 can be transferred to the elbow 205, and can thereafter pass into a first open end of the bulk auger 210. The bulk auger 210 can transfer the product to the second open end of the bulk auger 210 and into the dispensing chute 215 by rotating the auger 210 together with the integral or removably coupled fixed flighting 325.

As best shown in FIGS. 3A and 3C, the fixed flighting 325 can include the extending portion 330 on at least one end thereof to abut products as they enter the auger 210, 220 or to separate two of the products so that only one of the products is delivered in a singular fashion. The extending portion 330 can be any shape or size that allows for gripping and separation of products. As shown, the extending portion 330 extends at an angle from the fixed flighting 325, i.e., at an angle parallel to the first and second open ends of the auger 210, 220.

As discussed above, the tapered nature of the fixed flighting 325 can contribute to the efficiency of the delivery system 200, together with the friction, rotating speed, angle of inclination, and rotating amount of the auger 210, 220. For example, the fixed flighting 325 can have a flighting height that decreases from the inlet opening to the outlet opening of the auger 210, 220. In an embodiment, the flighting height is two inches at the inlet of the auger 210, 220 and is one-half inch at the outlet of the auger 210, 220. These dimensions represent flighting heights that are adaptable to a variety of products dispensed through the delivery system 200, and different heights can be implemented for different sized or shaped products.

The tapered nature of the fixed flighting 325, in combination with the inclination of the auger 210, 220, tends to allow only one product to travel on the flighting 325 nearest the outlet of the auger 210, 220. When multiple products are moved from the inlet to the outlet of the auger 210, 220, the decreasing width of the fixed flighting 325 causes only one sample to be "gripped" and the others to flow towards the inlet of the auger 210 based on gravity.

Figure 2B:
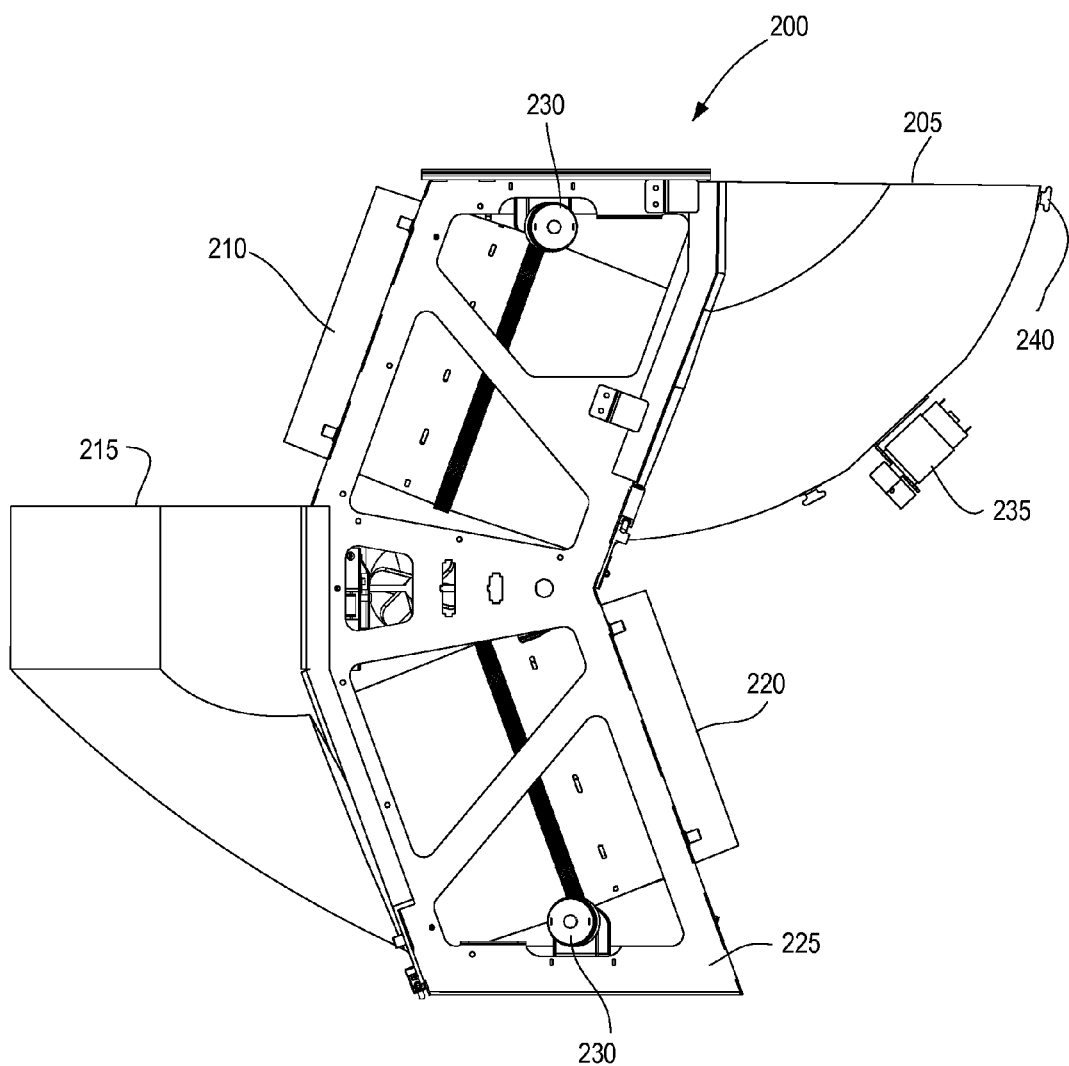

As shown in FIG. 2B, the bulk auger 210 and delivery auger 220 are inclined at an angle relative to the ground plane. The angle of the augers 210, 220 delivers the separated products one-by-one rather than dispensing more than one product at once. To achieve maximum efficiency (i.e., to dispense only one product at a time), the optimal friction, rotating speed, and angle(s) of the augers 210, 220 have been determined. The preferred inclined angle for the augers 210, 220 is approximately 0-30°, and more preferably 20°, relative to the ground plane, for most products. The fixed flighting 325 is also designed for optimal efficiency by its tapered nature. The angle of the fixed flighting 325 surfaces can be adjusted to better grip a product and dispense it to the customer. Further, the fixed flighting 325 can extend a particular length to better grip the product.

Figure 2C:
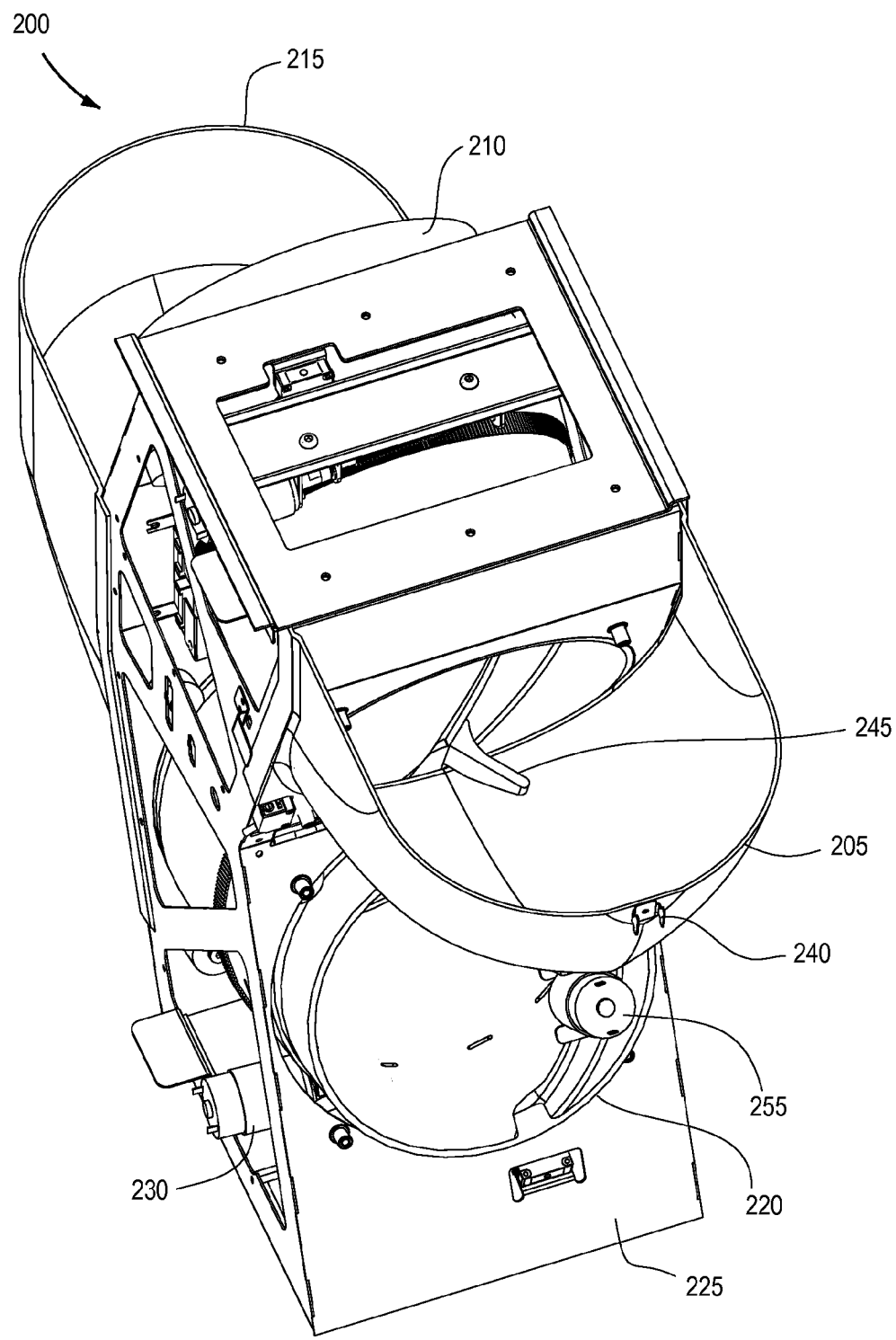

A tongue 245 can be attached to either one of the bulk auger 210 or the delivery auger 220 and can rotate within either the elbow 205 or the dispensing chute 215, respectively, to disengage products that may have coagulated with one another or that are otherwise lodged within the delivery system 200. As shown in FIG. 2C, the tongue 245 is attached to the bulk auger 210 and can rotate with the bulk auger 210 to move along or "scrape" or otherwise abut the surface of the elbow 205 and dislodge the products therein. The tongue 245 can also "grip" a product to allow for easier singular dispensation of a product.

Figure 2D:
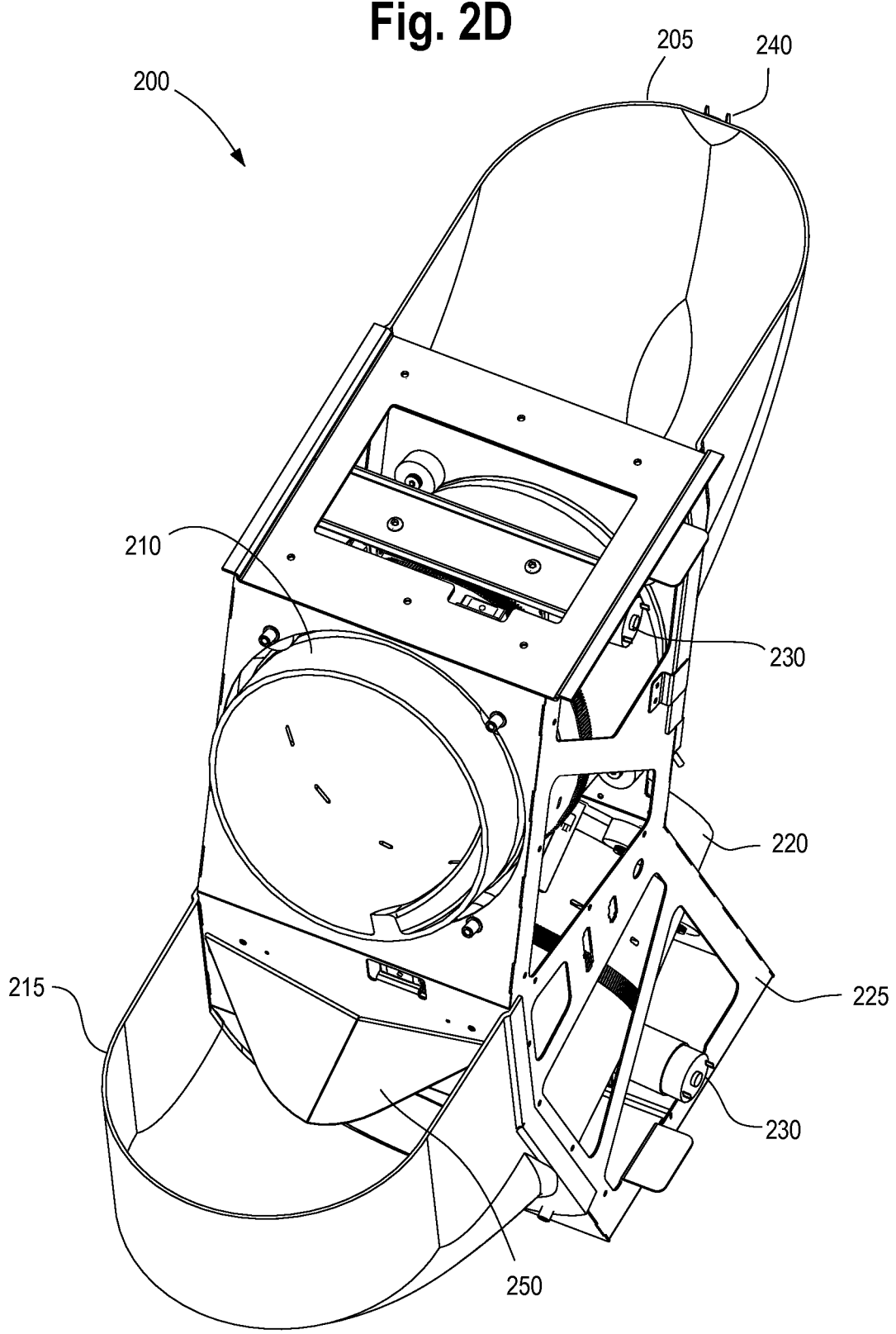

After a product is transferred through the bulk auger 210, the product enters into the dispensing chute 215. As shown in FIG. 2D, a channel 250 can be provided to facilitate entry of a product into the dispensing chute 215 in a serial manner without requiring a serviceman to individually load the product. The channel 250 may be a V-shaped piece of sheet metal or funnel-like structure that directs the product in one area of the dispensing chute 215.

As shown, the dispensing chute 215 is provided at its first open end below an exit path of the bulk auger 210, and communicates at its second open end with the entrance opening of the delivery auger 220. Products can therefore be delivered from the bulk auger 210 into the dispensing chute 215 and then to the delivery auger 220.

Similar to the bulk auger 210, the delivery auger 220 rotates and by way of the spiral flighting 325 provided in the delivery auger 220, can dispense the product out of the second open end of the delivery auger 220 and into the dispensation area 125. As shown in FIG. 3A, the bulk auger 210 and the delivery auger 220 can include substantially similar structure and configuration. However, it is understood that the bulk auger 210 and the delivery auger 220 can be made of different structures without departing from the spirit and scope of the present invention. For example, as discussed above, it is preferred that the bulk auger 210 and the delivery auger 220 are inclined at an angle of approximately 20° to the ground plane. However, the augers 210, 220 may be disposed at different angles from the ground plane. In addition, the augers 210, 220 can rotate simultaneously by way of the motors 230, or can rotate at different timing or speeds to one another. Other properties of the auger (material, friction, rotation speed, flighting properties, and others) can also be varied without departing from the spirit and scope of the present application. For example, as discussed below, interchangeable flighting inserts can be coupled within the augers 210, 220 to account for the different sizes, shapes and/or weights of products intended to be singularly dispensed from the delivery system 200.

The motor 230 facilitates movement of the auger 210 by engaging with a worm gear 320 provided on the outer circumference of the auger 210, 220. As shown, the motor 230 is a worm motor, but any type of electrical or mechanical motor may be provided within the spirit and scope of the present application. Further, magnetic actuation may be provided to rotate the auger 210, 220 at a preferred speed, acceleration and timing.

The sensor 233a-e can be an optical sensor that senses whether objects, such as products, are present in the hopper 110, the elbow 205, the dispensing chute 215 or either of the augers 210, 220. For example, a sensor 233a-e can be provided above the delivery auger 220 to sense objects within the delivery auger 220. However, sensors 233a-e can be provided within or outside of the different components of the delivery system 200 to sense objects within the hopper 110, the elbow 205, the bulk auger 210, the dispensing chute 215, or the delivery auger 220, or any combination of the above.

The sensors 233a-e can actuate various agitators 235 to dislodge products that have been lodged in the system or have coagulated with one another. For example, the agitator can be an off-balanced or eccentric weight that is connected to a motor, and the motor is adapted to vibrate the weight in order to agitate the products therein. The agitator can be activated by either manual actuation (e.g., by way of the touch-screen display 215) or automatically if one or more of the sensors 233a-e detect that products are not being dispensed properly.

The sensors 233a-e can be located inside the delivery system 200 component itself, or can be positioned outside of the component but in a position to sense objects within the component. For example, the sensor 233a-e can be connected to the elbow 205 but sense objects within the delivery auger 220. However, the sensor 233a-e could be located directly within the delivery auger 220 to sense objects therein. Other sensor combinations can be implemented to determine the location of product(s) or the functionality of the delivery system 200 without departing from the spirit and scope of the present application.

The sensors 233a-e can be connected to one another such that the precise location of products within the delivery system 200, if any are present, can be determined. For example, a first sensor 233a can be provided to sense objects in the hopper 110, a second sensor 233b can be provided in the elbow 205, a third sensor (not shown) can be provided at an inlet opening of the bulk auger 210, and a fourth sensor (not shown) can be provided in the outlet opening of the bulk auger 210. Additional sensors 233c-e can be provided in other areas of the delivery system 200. Also, a similar sensor 233a-e configuration can be provided in the dispensing chute 215 and delivery auger 220. If the second sensor 233b in the elbow 205 does not sense a product but the first sensor 233a senses that objects are present in the hopper 110, the delivery system 200 will determine that products are lodged in the hopper 110 and will actuate an agitator in the hopper 110 to dislodge the products. Similarly, if the third sensor fails to sense any product in the bulk auger 210 but the second sensor 233b senses products in the elbow 110, the delivery system 200 can actuate the agitator 235 in the elbow 110 and dislodge products in the elbow.

Within the bulk auger 210, if products are sensed at the inlet opening but not at the outlet opening, the tongue 245 can be actuated to dislodge products that are within the bulk auger 210. If all of the sensors 233a-e fail to detect any product, the delivery system 200 will determine that no products are available to be dispensed and will issue an "Out of Product" notice to the consumer and/or the service technician. Of course, the above example was applied to only the hopper 110, elbow 205, and bulk auger 210, but the present application is not so limited. The general concept of communicating information from downstream sensors 233a-e to upstream agitators can be implemented in any way and in combination with any component of the present application.

Another application of the sensors 233a-e is to save power used by the augers 210, 220 and to avoid over-rotation of the augers 210, 220. For example, when a product is dispensed through the delivery system 200, the bulk auger 210 can rotate until the product is sensed by a sensor 233c located in or around the dispensing chute 215. Once the product is sensed in the dispensing chute 215, the delivery system 200 knows that the product has exited the bulk auger 210 and thus stops rotation of the bulk auger 210. The same principle can be applied to the delivery auger 220 as well—rotating the delivery auger 220 until a product is sensed at either the outlet opening of the delivery auger 220 or downstream in the product dispensation area 125. Other combinations of the above can be implemented within the spirit and scope of the present invention.

As shown, the delivery system 200 includes two augers—a bulk auger 210 and a delivery auger 220. However, the present application is not limited to a two-auger system, and can include one, two, three, or more augers. For example, a single auger can be implemented and can include substantially the same structure as the bulk auger 210 or the delivery auger 220. The single auger can include a barrel portion and internal flighting that is either integral with or attached to the internal wall of the barrel portion. Alternately, as discussed below, one or more of the augers can include one or more interchangeable flighting inserts that are removably coupled to the auger or the existing fixed flighting 325. In other words, the interchangeable flighting inserts can change the profile, shape, cross section, size, and/or frictional coefficient of the flighting by either replacing the fixed flighting 325 or being inserted on top of the fixed flighting 325. Each of the above structures rotates as a whole—with both the barrel and flighting rotating together—to reduce pinch points and avoid substantial damage to the product as compared to the conventional fixed barrel and rotating flighting design.

The single auger system can distribute products more efficiently by manipulating the properties of the products themselves. For example, the size, weight, shape, volume, or friction of the products can be altered to improve the efficiency of distribution through the single auger or multiple auger system. The single auger system can also be implemented in combination with another singulation device that dispenses objects in a singular fashion or that divides bulk-loaded objects into single samples, for example, a dividing barrier or ramp.

Figure 6:
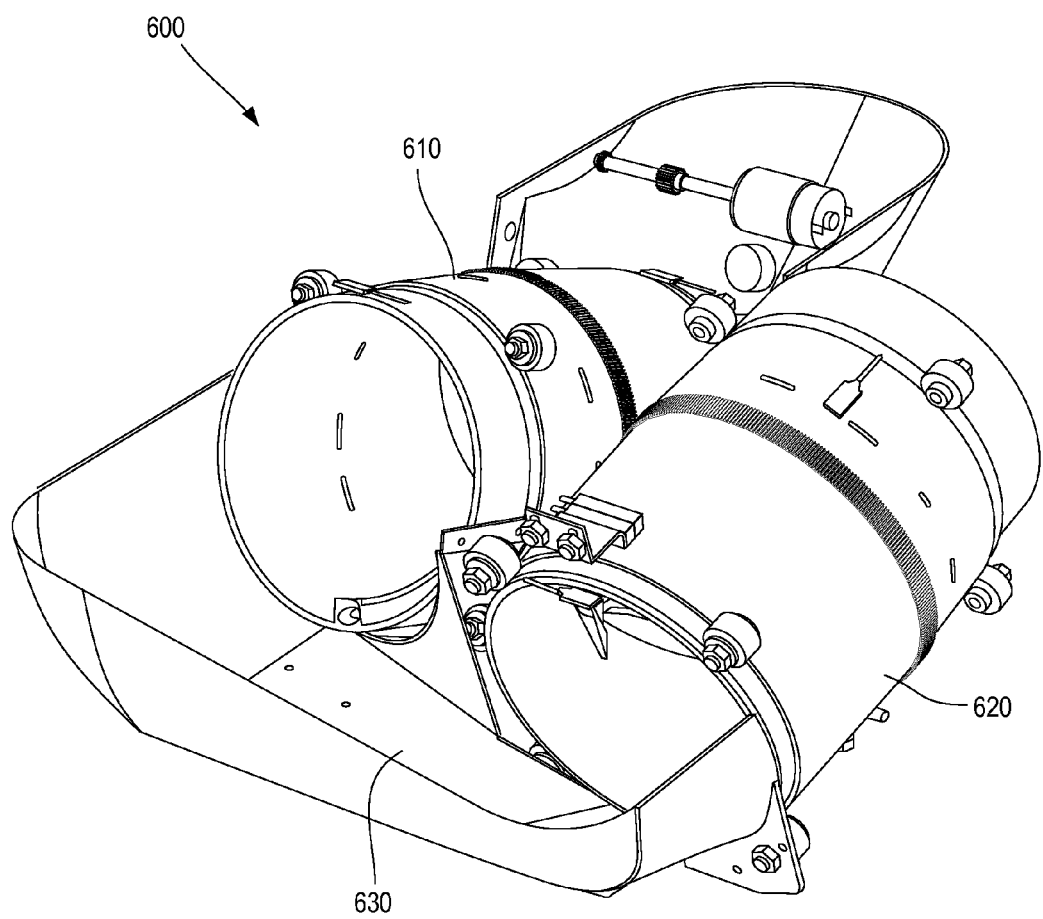
FIG. 6 illustrates a horizontal auger embodiment of the present application.

As shown, the delivery system 200 includes multiple augers 210, 220 with the bulk auger 210 directly above the delivery auger 220. However, as shown in FIG. 6, another type of delivery system 600 can include augers 610, 620 disposed horizontal to one another and communicating with one another via a deflector plate 630. Products can thus be dispensed into the hopper 110 and eventually be transmitted to the bulk auger 610. The bulk auger 610 can then rotate and transfer the product, by way of the transfer ramp 630, into the delivery auger 620. The delivery auger 620 thereafter rotates and dispenses the product into the product dispensation area 125. The horizontal auger embodiment is advantageous for spacing purposes where a more vertical design is not plausible, e.g. in a low ceiling area.

Figure 4A:
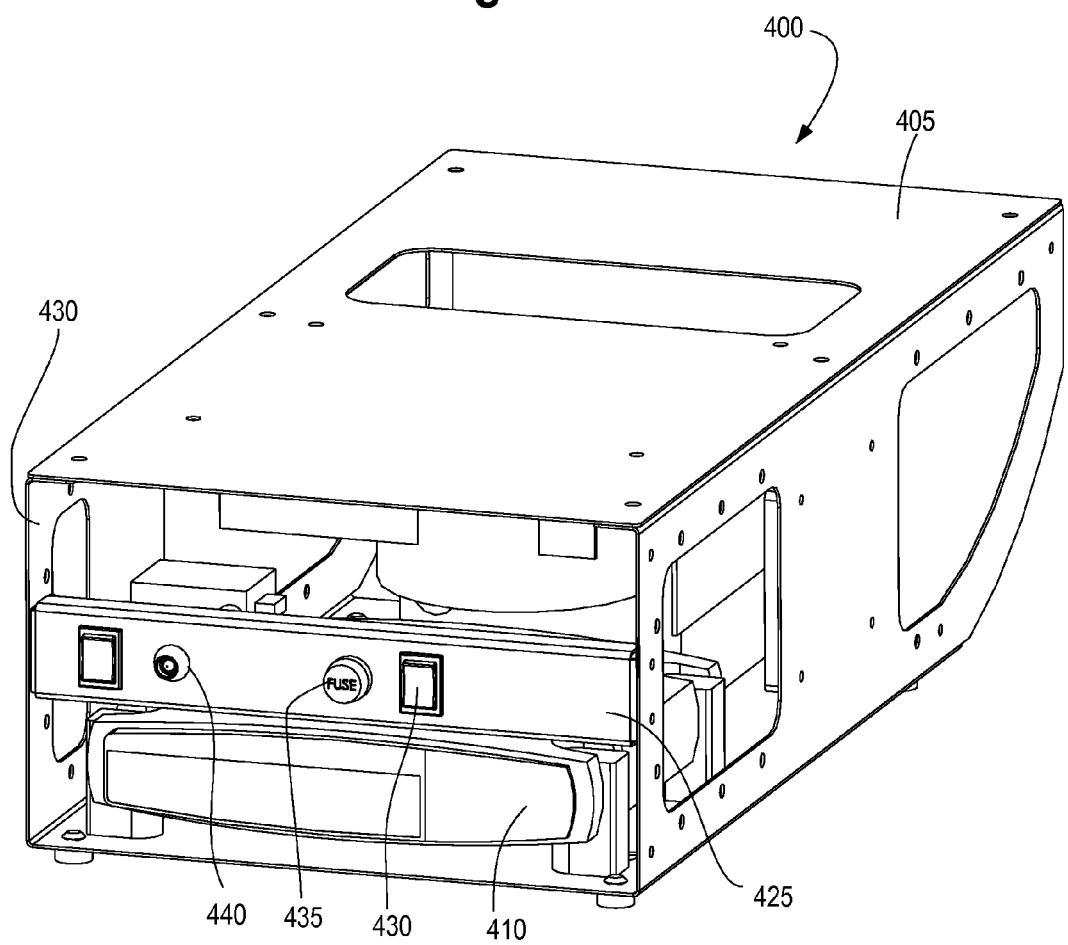
FIGS. 4A-4B illustrate an electronic console of the product dispensing device shown in FIG. 1.
Figure 4B:
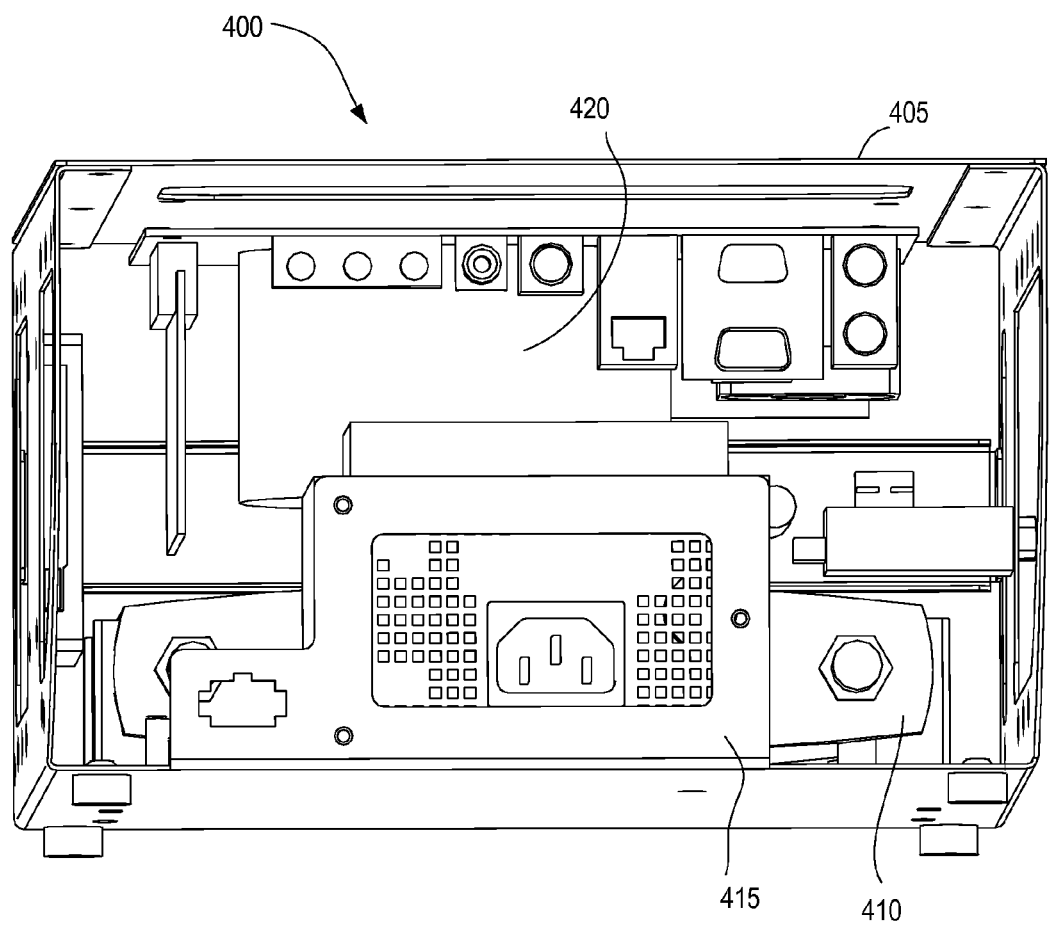

FIGS. 4A and 4B discloses an electric console 400 in accordance with an embodiment of the present application. As shown, the electric console 400 includes a bracket 405 that acts as a backbone for the contents of the electric console 400. A wireless router 410, power source 415, motherboard 420 and a mounting plate 425 can be attached to the bracket 405. Attached to the mounting plate 425 are one or more switches 430, a fuse 435 and a functionality indicator 440.

The power source 415 can deliver power to the electrical components of the product dispensing device 100, for example, the display 115 and the scanner 120. In addition, the power source 415 can supply power to the delivery system 200 or the delivery system 200 can include its own power source and electric console. In an embodiment, the power source 415 is connected to a standard wall socket or surge protector to provide electrical power to the product dispensing device 100.

The power source 415 can also include a battery that is operative to power the product dispensing device 100 when the motherboard 420 determines that the product dispensing device 100 is not being adequately powered by the standard wall socket connection. Optionally, when the power source 415 switches from a standard wall socket connection to a battery connection, the access point 140 may contact an external computer and notify the necessary personnel that the product dispensing device 100 is operating on temporary power.

The motherboard 420 provides the controlling backbone of the product dispensing device 100 and includes computer components necessary for the product dispensing device 100 to function. For example, the motherboard 420 can include a memory and a processor for transmitting video or images to the display 115, data relating to the number of times a user has swiped their card, data relating to the maximum number of user accesses that are permitted, or any other form of relevant data.

The motherboard 420 can also store the general operating system for the product dispensing device 100 and can control functionality of the scanner 120 and delivery system 200. For example, the motherboard 420 can instruct the delivery system 200 to rotate the augers 210, 220 at a precise speed or speeds determined based on the friction and angle of inclination of the augers 210, 220 and status of the sensors 233a-e. Various algorithms may be stored in the memory of the motherboard 420 to determine the necessary speed and timing of rotation for the augers 210, 220, which, as discussed above, can vary between the augers 210, 220. Alternately, a separate motherboard 420 may be provided with the delivery system 200 for precise controlling of the delivery system 200.

The motherboard 420 can transmit data stored in its memory to an outside computer as necessary. For example, when the memory is almost full, the motherboard 420 can communicate with the access point 120 and transmit the contents of the memory to an outside computer. In this manner, the outside computer can store data relating to the number of accesses for a particular product, the amount of product remaining, or other operating parameters without requiring a visit to the product dispensing device 100. The motherboard 420 can also transmit memory contents to an internal or external permanent storage when the motherboard 420 determines that the power source 415 is running on battery power.

The mounting plate 425 can include one or more switches 430 for actuating electrical components attached to the product dispensing device 100. In addition, a fuse 435 can be provided for protecting the product dispensing device 100 against electrical surge, and a functionality indicator 440 can be provided to indicate whether the electrical components of the product dispensing device are operating effectively.

The motherboard 420 can also include a coupon dispensing program to dispense a product coupon to a user, typically for the product being dispensed through the product dispensing device 100. For example, the motherboard 420 can store and execute a coupon distribution program to dispense coupons to the customer via a coupon printer (not shown) or wirelessly to the card or other identifying indicia of the user. The coupon can provide additional discounts to the user of the device 100 for extra incentive to purchase the product.

The coupon dispensing program can vary the dispensing process from consumer to consumer. For example, the coupon distribution program can identify the buying habits of the consumer as they pertain to the product being dispensed. Naturally, a consumer who frequently purchases the product being dispensed would need a smaller incentive to purchase the product again based on their frequent buying habits. However, a consumer who has not yet purchased the product may need an additional incentive. The product dispensing program can thus identify the user, analyze their buying habits based on data transmitted to or stored by the motherboard 420, and can selectively dispense or omit dispensing a product coupon to a user. Any other method can also be used to control shopper behavior based on incentivized discounts, in addition or alternatively to the above.

Figure 5:
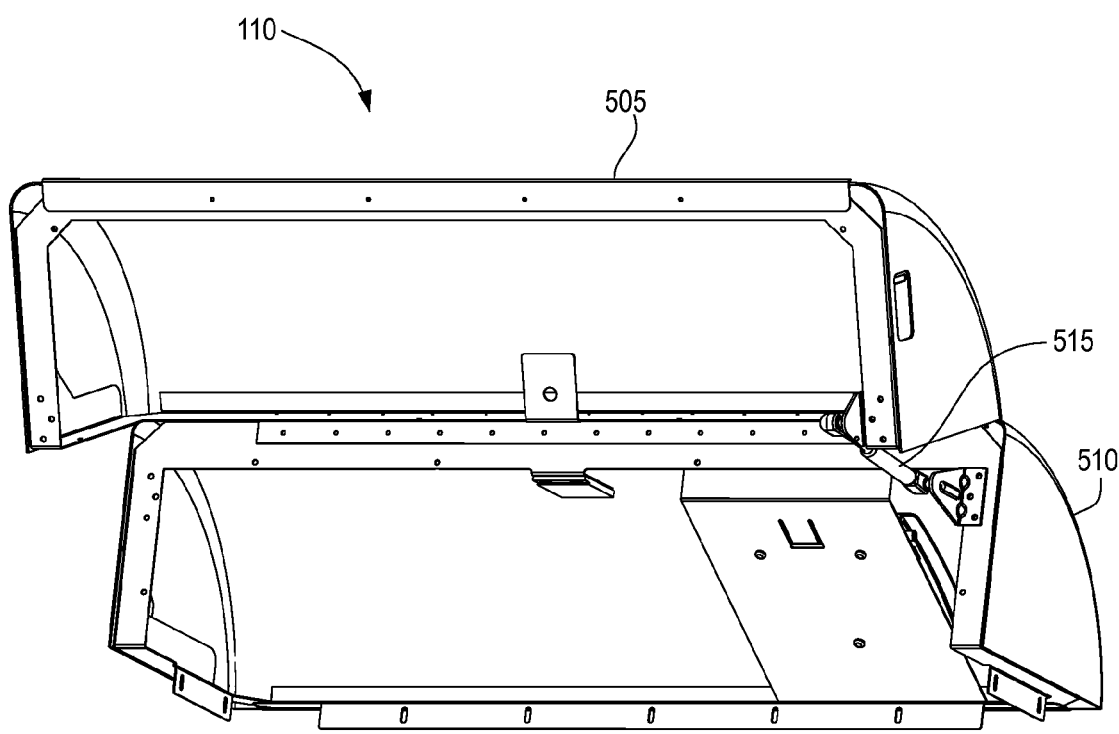
FIG. 5 illustrates a hood allowing access to a hopper of the product dispensing device shown in FIG. 1.

A hopper 110 in accordance with the present application is shown in FIG. 5. As shown, the hopper 110 includes a lid 505 and a support 510 attached by way of a hinge. A cylinder 515 is also provided and is connected to both the lid 505 and support 510 for resisting the force of gravity when the lid 505 is in the upward position. The cylinder 515 may also include a locking mechanism (not shown) for locking the cylinder 515 in place when the lid 505 is in the open position.

One process of using the product dispensing device 100 will now be discussed. A user can transmit an identification number to the product dispensing device 100 by, for example, scanning a bar code on a card or smart phone. The motherboard 420 of the product dispensing device 100 will then determine whether the identification number has already been scanned the maximum number of times or if the identification number listed on the identification card can be dispensed a product from the product dispensing device 100. If the card is eligible to dispense a product, the motherboard 420 will cause the motors 230 to rotate a predetermined amount, at a predetermined speed and at a predetermined time based on the speed and friction of the augers 210, 220 so as to deliver a product from the hopper 110 through the bulk auger 210, into the dispensing chute 215, and then into the delivery auger 220.

Again, the motors 230 need not rotate both augers 210, 220 at the same time, and in a preferred embodiment will rotate the bulk auger 210 prior to rotating the delivery auger 220. This reduces the amount of electricity that is used when the auger(s) 210, 220 are rotated but products are located in areas of the delivery system 200 other than the rotating auger(s) 210, 220. Once the delivery auger 220 rotates a predetermined amount and/or speed, a single product is dispensed in the dispensation area 125 where the user can retrieve the product.

If the user scans their card and the motherboard 420 determines that the card is not eligible for product dispensation, the display 115 will alert the user that the product will not be dispensed and that the card has been denied. The display 115 may then give the user instructions for how to obtain a new card, or the reasoning behind why the card was denied (e.g., the card could not be scanned because of a functional error).

A method of servicing the delivery system 200 according to the present application will now be discussed. A serviceman can open the door of the product dispensing device 100 to access the inside of the product dispensing device 100 by disengaging the latch 135 as shown in FIG. 1. The serviceman can then release the cord on the cord attachment 240 and rotate the elbow 205 away from the bulk auger 210 so as to allow the serviceman to purge any products from the elbow 205 and bulk auger 210 upon rotating the elbow 205, the serviceman can also view the contents of the augers 210, 220, and remove any contents from the augers 210, 220. The serviceman can then rotate the elbow 205 upward and against the frame 225, and can reattach the elbow 205 to the frame 225 by way of, for example, a bungee cord. Following this step, the serviceman can then load the hopper 110 with a plurality of products by placing the products loosely into the hopper 110, rather than having to load the hopper 110 one-by-one with products.

Should the serviceman need to change the video or image on the display 115 (e.g., if the new product is being dispensed by the product dispensing device), the serviceman can either do so manually at the site of the product dispensing device 100 or can transmit electronic instructions to the product dispensing device 100 by way of the access point 140. For example, the service technician can scan a card to change the video or image on the display 115, and to otherwise reprogram the product dispensing device 100 to depict a new product. Alternatively, the motherboard 420 can include predetermined instructions to change the contents of the display 115 at a predetermined time to facilitate a change of product being dispensed.

A computer-readable recording medium can be contained within the motherboard 420 (e.g., as the "memory" discussed above) or within the external computer, and can store a computer program that optimizes the efficiency of the dispensing device 100. The computer-readable recording medium can store any data or computer programs for use in the dispensing device 100. For example, the computer-readable recording medium can store a computer program for optimizing the performance of the dispensing device 100. The computer-readable recording medium can also store an operating system for the dispensing device 100 or any other software or data that may be necessary for the dispensing device 100 to function. Without limitation, the computer-readable recording medium can include any non-transitory computer-readable recording medium, such as a hard drive, DVD, CD, flash drive, volatile or non-volatile memory, RAM, or any other type of data storage.

Figure 7:
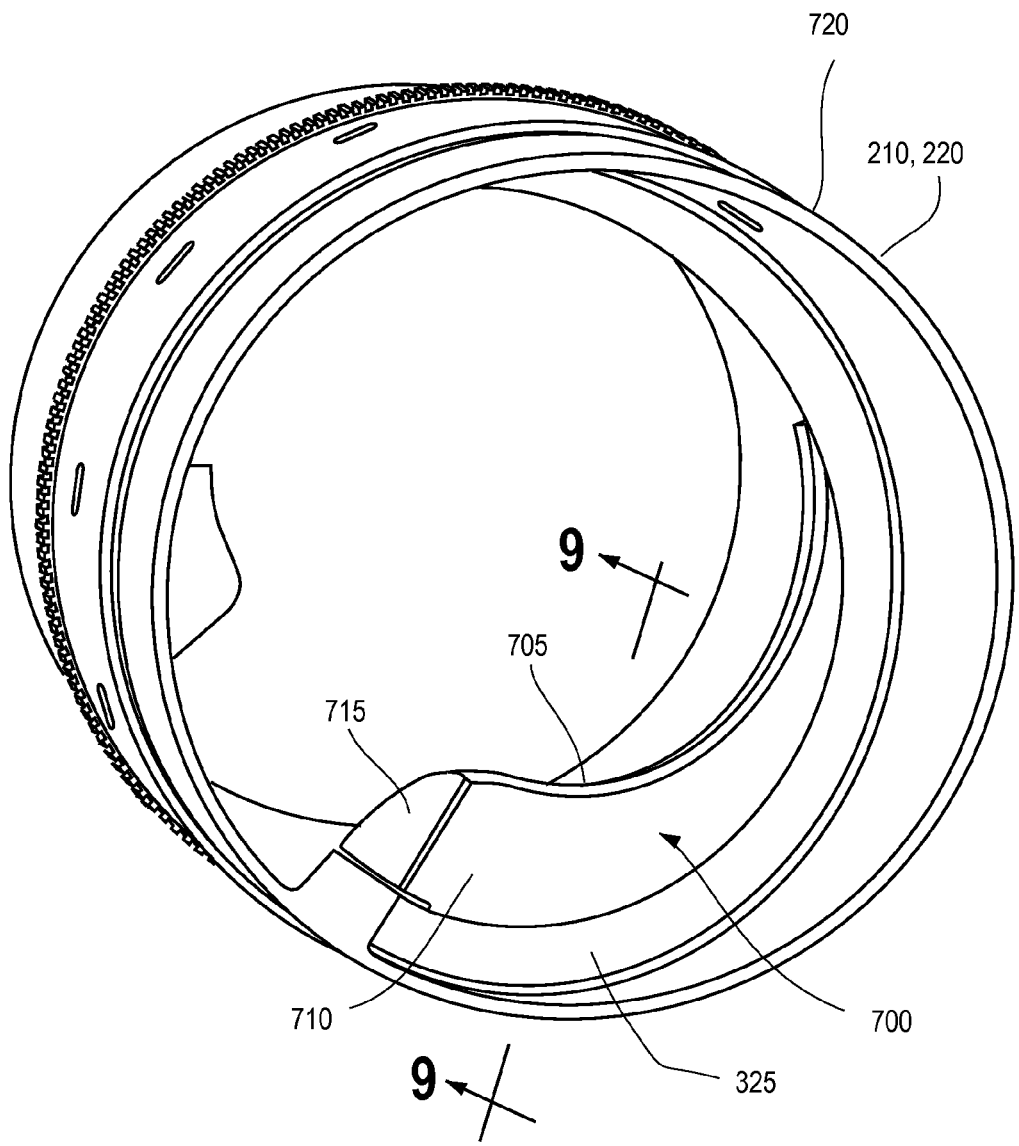
FIG. 7 illustrates an interchangeable flighting insert coupled to an auger in accordance with an embodiment of the present application.

FIG. 7 illustrates an embodiment interchangeable flighting insert 700 removably coupled to an auger 210, 220 in accordance with an embodiments of the present application. As shown, the insert 700 includes an upstream face 705, downstream face 710, and extends from a first end 715 to a second end 720. In an embodiment, the insert 700 is removably coupled to only the delivery auger 220, but the insert 700 can be provided within either auger 210, 220.

The interchangeable flighting insert 700 can be chosen to improve delivery efficiency by providing varying geometry, shape, frictional coefficient, and/or size to the fixed flighting 325 to suit a particular product being dispensed from the dispensing device 100. For example, a larger object may not be impacted by the fixed flighting 325 or a less conventionally-shaped object may benefit from a differently shaped flighting. Rather than manufacturing different augers 210, 220 for each product, and thus remove the entire auger 210, 220 when changing products to be dispensed, the insert 700 can be removably coupled to the auger 210, 220 and achieve more efficient delivery. As used herein, the term "upstream" means the direction from which products enter the auger 210, 220, and the term "downstream" means the direction from which products exit the auger 210, 220.

Different inserts 700 can have different properties to account for the different shapes, sizes, packaging and/or weights of objects being dispensed from the dispensation device 100. For example, two different inserts 700 may have different cross-sectional profiles, lengths (i.e., a dimension extending radially along the interior of the auger 210, 220), heights (i.e., a dimension extending radially inward within the auger 210, 220), frictional coefficients, and materials (e.g., to be more flexible or rigid). For example, the cross-sectional profiles of inserts 700 can have different curvatures along the downstream face 710, angles of inclination of the downstream face 710 relative to the fixed flighting 325, or any other characteristic that can improve the efficiency of delivering a product through the product dispensing device 100. Of course, the above features of the insert 700 can also be different from those of the fixed flighting 325. It will be appreciated that any variation of the cross-sectional profiles, lengths, heights, frictional coefficients, and materials of the inserts 700 can be used without departing from the spirit and scope of the present application.

Figure 8:
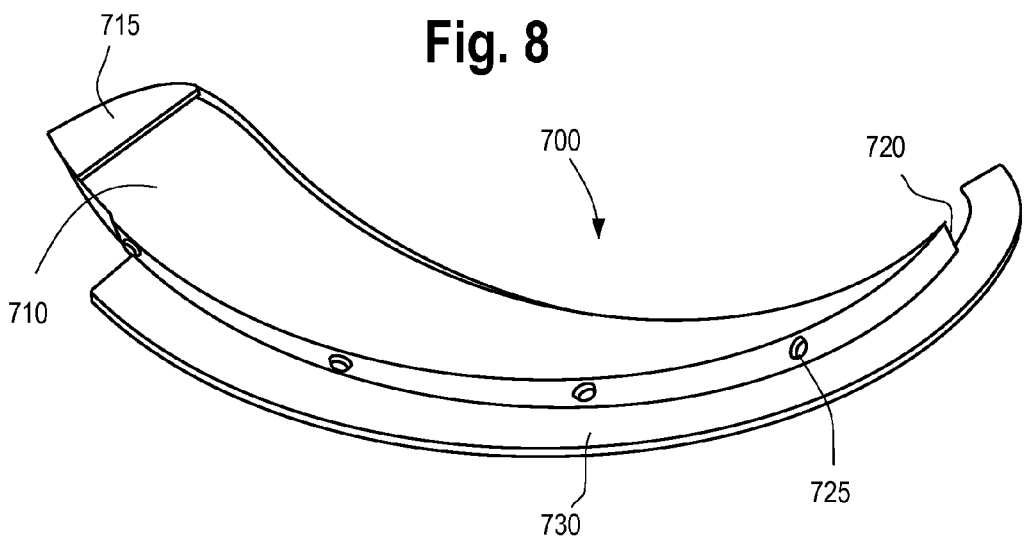
FIG. 8 illustrates an interchangeable flighting insert in accordance with an embodiment of the present application.

As shown in FIG. 8, the insert 700 can include insert coupling members 725 disposed on a surface of the insert 700. In an embodiment, the insert coupling members 725 are magnets that correspondingly couple to magnets disposed along the fixed flighting 325 to removably couple the insert 700 to the auger 210, 220. However, any other form of coupling members 725 can be implemented without departing from the spirit and scope of the present application. For example, the coupling members 725 can be a single or multiple members, and can include adhesive, Velcro®, fasteners such as screws or nails, detent mechanisms, friction fits, or any other means of removably coupling two objects together. Also, the insert 700 can couple directly to the auger 210, 220 without coupling to the fixed flighting 325, or can similarly couple to an auger 210, 220 that does not include fixed flighting 325.

As shown, the insert 700 can include a ledge 730 that is positioned along the upstream facing side of the fixed flighting 325 for additional rigidity. The ledge 730 can be any shape or size, but in an embodiment, is shaped corresponding to the fixed flighting 325 and extends up to or past the second end 720 of the insert.

Figure 9:
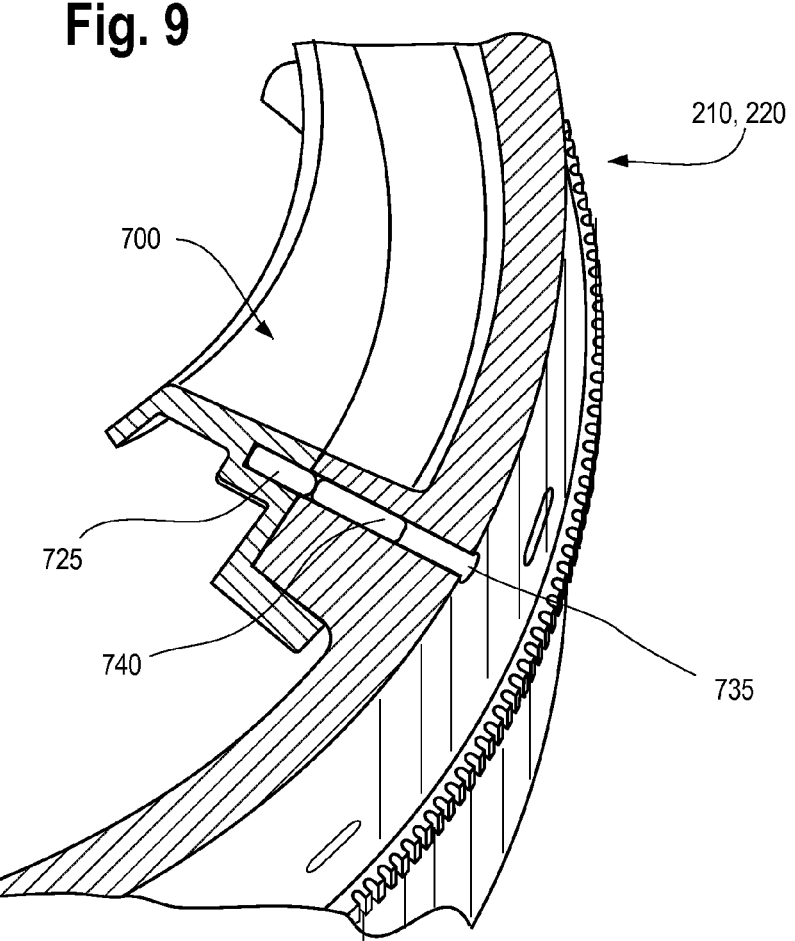
FIG. 9 illustrates a sectional view of an exemplar interchangeable flighting insert coupled to an auger in accordance with an embodiment of the present application.

FIG. 9 illustrates a sectional view of the insert 700 coupled within the auger 210, 220 in accordance with an embodiment of the present application. As shown, the auger 210, 220 can include cavities 735 with auger coupling members 740 inserted inside. Similar to the insert coupling members 725, the auger coupling members 740 can be any object or combination of objects that can couple with the insert 700. In an embodiment, the auger coupling members 740 are magnets that correspondingly couple with magnets disposed in the insert 700.

The scanner 120 can assist the servicing technician to choose the proper insert 700 for a particular product. For example, the scanner 120 can be used to scan barcode or receive a signal from a smart phone that identifies the product to be dispensed. Upon receiving this information, the motherboard 420 can retrieve information from the memory that identifies the most efficient insert 700 selection based on testing or field results of the particular insert 700 relative to the product being dispensed. For example, the motherboard 420 may determine that a particular insert 700 is most efficient, or determine that an insert 700 should be positioned within the auger 210, 220 in a certain manner (e.g., positioned so the first insert coupling member 725 is disposed against the second auger coupling member 740). This information can be shown on the display 115 for a technician to see to aid in the servicing process.

The products that are dispensed from the product dispensing system can generally include free samples, but the present application is not so limited. For example, the dispensing device 100 can dispense products that require the user to spend money, for example, money that is represented by the customer ID on the card that is scanned by the scanner 120. Further, the products may not be consumer products, but can be any type of substance or product that is capable of being transported within the structure of the product dispensing device 100, for example, toys, gifts, pencils, pens, tools, or any other suitable object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An auger to dispense objects in a singular manner, the auger comprising:
   a barrel portion including:
      a first open end receiving the objects at a first extreme end of the auger and an opposing second open end disposed at a second extreme end of the auger distal from the first extreme end;
      an internal surface disposed on an interior of the barrel portion; and
      an external surface disposed on an exterior of the barrel portion opposite the interior of the barrel portion;
   fixed fighting disposed on the internal surface from the first open end to the second open end;
   a flighting insert removably coupled to the fixed fighting and extending radially inward from the flighting, the flighting insert having a shape different from the fixed fighting; and
   a memory storing information identifying an insert selection corresponding to the object.

2. The auger of claim 1, wherein the fighting insert includes an insert cross-sectional shape and the flighting includes a fighting cross-sectional shape, and wherein the insert-cross-sectional shape is different from the fixed flighting cross-sectional shape.

3. The auger of claim 2, wherein the insert cross-sectional shape includes an insert downstream face shape different from a fixed fighting downstream face shape of the fixed fighting.

4. The auger of claim 3 wherein the insert downstream face shape includes an insert curvature different from a fighting curvature of the fixed flighting.

5. The auger of claim 1, wherein the fighting insert includes an insert height extending radially inward within the auger, and the fixed fighting includes a fixed fighting height extending radially inward within the auger, and wherein the insert height is different than the fixed flighting height.

6. The auger of claim 1, wherein the insert includes a ledge adapted to extend along a fixed flighting downstream face.

7. The auger of claim 1, further comprising a motherboard wherein the motherboard communicates with a display to provide an instruction to couple the insert selection to the auger.

8. The auger of claim 1, wherein the memory stores information identifying a position of the insert selection relative to the fixed flighting.

9. The auger of claim 1, wherein the flighting insert includes magnets in substantial alignment to couple with corresponding magnets disposed on the fixed fighting.

* * * * *